United States Patent
Oest et al.

(10) Patent No.: US 12,511,655 B2
(45) Date of Patent: Dec. 30, 2025

(54) CROSS-ENTITY REFUND FRAUD MITIGATION

(71) Applicant: PAYPAL, INC., San Jose, CA (US)

(72) Inventors: Adam Oest, Fountain Hills, AZ (US); Raoul Johnson, Scottsdale, AZ (US); Muhammad Saad, Scottsdale, AZ (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 17/934,337

(22) Filed: Sep. 22, 2022

(65) Prior Publication Data
US 2024/0104568 A1 Mar. 28, 2024

(51) Int. Cl.
*G06Q 20/40* (2012.01)
(52) U.S. Cl.
CPC ....... *G06Q 20/4016* (2013.01); *G06Q 20/407* (2013.01)
(58) Field of Classification Search
CPC .......................... G06Q 20/4016; G06Q 20/407
USPC ........................................................... 705/44
See application file for complete search history.

(56) References Cited

U.S. PATENT DOCUMENTS

| | | | | |
|---|---|---|---|---|
| 8,046,260 | B2* | 10/2011 | Haddad | G06Q 40/12 705/16 |
| 8,620,798 | B2* | 12/2013 | Faith | G06Q 30/00 705/38 |
| 9,172,808 | B2* | 10/2015 | Zeppenfeld | H04M 3/523 |
| 11,568,286 | B2* | 1/2023 | Nourian | G06N 5/045 |
| 2014/0039942 | A1* | 2/2014 | Groarke | G06Q 20/4016 705/5 |
| 2022/0005034 | A1* | 1/2022 | Ravi | G06Q 20/206 |

* cited by examiner

*Primary Examiner* — Clifford B Madamba
(74) *Attorney, Agent, or Firm* — Haynes and Boone, LLP

(57) ABSTRACT

Methods and systems are presented for cross-entity fraud mitigation. A refund request for a transaction between a first entity and a second entity is received via a network from a device of the first entity. A transaction history associated with an account of the first entity with a service provider is obtained. From the obtained transaction history, metadata relating to previous refund requests processed for previous transactions associated with the account of the first entity is extracted. The extracted metadata is evaluated to determine a risk score for the refund request received for the transaction, where the risk score indicating a risk of fraud associated with the refund request. A decision on authorization of the refund request is generated for the transaction, based on the risk score. A notification of the decision is transmitted via the network to a device of the second entity.

20 Claims, 9 Drawing Sheets

CROSS-ENTITY REFUND FRAUD MITIGATION

TECHNICAL FIELD

The present specification generally relates to refund fraud mitigation, and more specifically, to cross-entity refund fraud mitigation through data sharing between different entities at risk of refund fraud.

BACKGROUND

For years, thieves have been employing a wide array of clever tactics to steal goods from merchants. Although a suite of technologies serves to protect retailers from many traditional types of fraud, criminals are constantly adapting to changes within the ecosystem and finding innovative ways to profit. "Refund fraud" refers to a class of fraudulent schemes in which criminals obtain a refund from a merchant without ever returning the originally purchased goods. Thus, such fraud is equivalent to directly stealing from the merchant. Although refund fraud has targeted physical stores for many years (e.g., by means of fake receipts or item substitution), the growth of highly accessible and customer-centric online shopping experiences has presented criminals with a more lucrative avenue for defrauding merchants. To ensure customer satisfaction, online marketplaces and payment services routinely offer buyer protection to give shoppers peace of mind. Similarly, merchants offer flexible return policies to avoid discouraging shoppers in the long term. Unfortunately, such policies are also prime targets for abuse.

There are many variants of online refund fraud. Some schemes leverage social engineering tactics to trick customer service representatives (CSRs) into offering a refund, while others exploit loopholes in return policies (such as the lack of verification of return package contents or unreliable outbound shipment tracking) or thresholds for return-free refunds. In cybercriminal underground communities, refund fraud is offered as a service. A customer will first legitimately purchase an item from a merchant. Then, the customer hires a refund fraud expert, who charges a commission based on the item's value. The expert then engages with the merchant and obtains a refund for the customer (or provides detailed instructions on how to do so).

Due to the wide range of tactics that criminals can use to orchestrate refund fraud, corresponding mitigations must cover a wide range of vulnerable areas, such as return policies, payment processing, customer service interactions, return processing, and shipping. Even if such mitigations at a merchant are effective, it is possible for criminals to successfully carry out refund fraud, e.g., when paying through a third-party payment processor (i.e., a payment card network or online wallet), criminals can bypass the merchant entirely by filing a claim directly with the processor. If the payment processor is fooled, the scheme will be carried out successfully at the expense of the merchant. The scheme can also be carried out in reverse order (e.g., with a scammer first contacting the payment processor, then the merchant if unsuccessful). Thus, there are situations in which either the merchant or payment processor becomes aware of fraud, but not both, so the fraud fails to be mitigated when the criminal contacts the non-aware party.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings.

DETAILED DESCRIPTION

Figure 1:
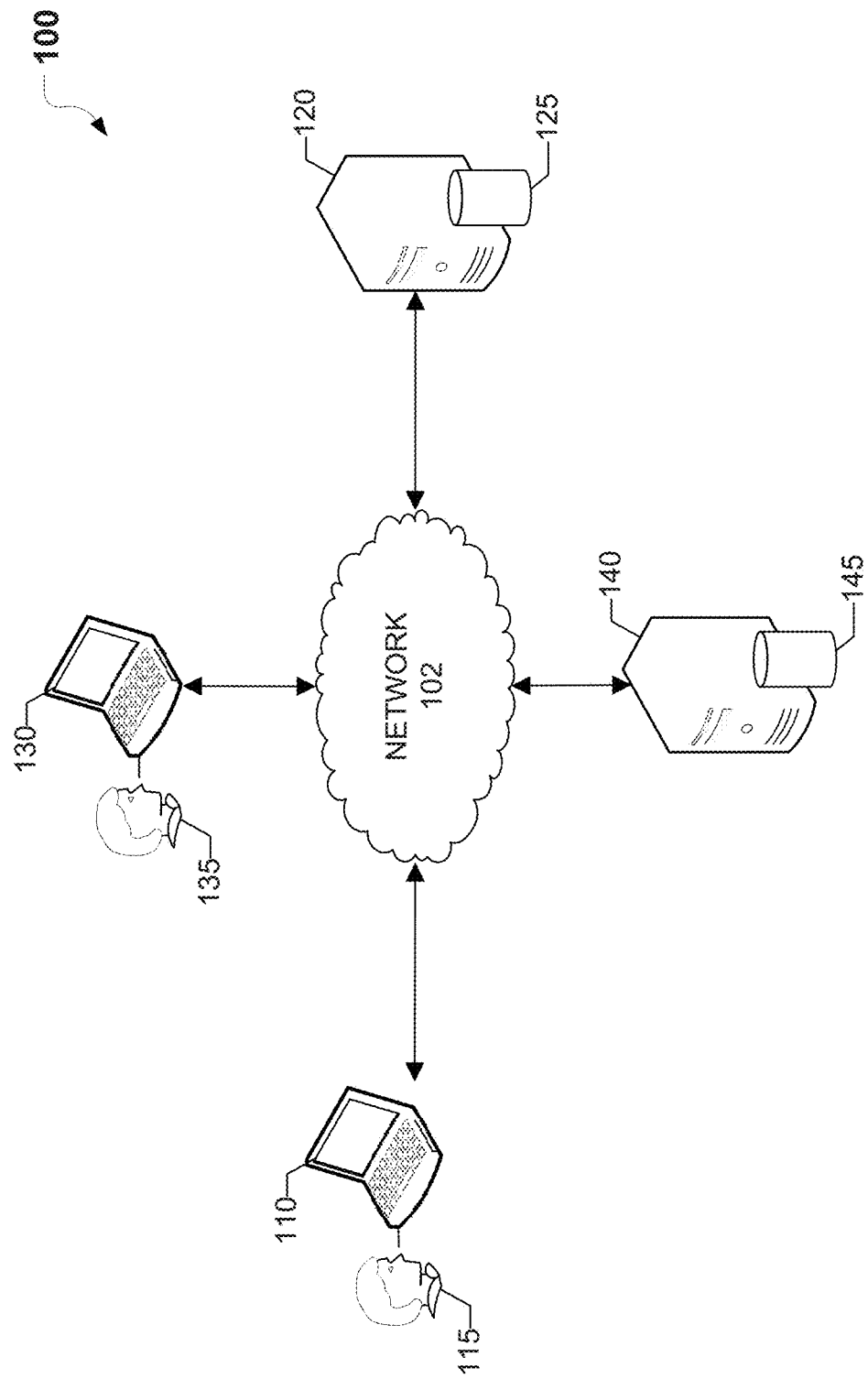
FIG. 1 is a block diagram of a network communication system in accordance with an embodiment of the present disclosure.

Embodiments of the present disclosure are directed to mitigating cross-entity refund fraud through a real-time fraud alert system accessible to different entities at risk of refund fraud. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to detect and mitigate refund fraud associated with transactions between different entities. Such entities may include, but are not limited to, users or consumers of online products and services, online merchants, businesses, retailers, and other public or private organizations. Such entities may also include online service providers that provide payment processing services to facilitate transactions between other entities, e.g., consumers and merchants. The term "refund fraud" may refer to any fraudulent scheme in which an entity (e.g., a consumer or agent thereof) attempts to obtain a refund for the price of an item purchased or obtained from another entity (e.g., a merchant) without ever returning the item. For example, a user or consumer may purchase the item from a merchant, receive the item, and subsequently claim that the item was never received or that the received item is defective or not as described. Oftentimes, the merchant or a payment service provider (or "payment processor") involved in the transaction may become aware of such fraudulent activity. Due to a lack of data sharing between the merchant and payment processor, it is rare for the fraudulent activity to be detected by both parties in this example. Thus, refund fraud fails to be mitigated when only one of the targeted entities involved in a transaction detects the fraud and a perpetrator (or "fraudster") contacts another entity who is unaware of the fraud to successfully obtain the refund. In some cases, neither entity may be aware of the fraud, but a risk of fraud detected by one entity (e.g., risk signals produced by a fraud detection system of the payment processor) may empower the other entity (e.g., the merchant) to effectively detect and mitigate the fraud before it occurs. In other cases, a fraudster may contact a customer service agent of an entity (e.g., by calling a customer support hotline) to request a refund without providing any evidence to support the request, and then attempt to commit fraud by falsely representing to a different agent of the same entity (e.g., via a chat application or other customer support interface) that the first agent had already approved the refund. Accordingly, the disclosed cross-entity refund fraud mitigation techniques may be used to detect and mitigate attempts by fraudsters to commit refund fraud by exploiting security vulnerabilities and information gaps associated with one or more customer service or support systems of the same entity as well as those associated with disparate customer service or support systems of different entities involved in a transaction.

In some embodiments, the disclosed techniques may be used to provide a fraud monitoring and alert system for automatically detecting potential refund fraud and notifying relevant entities of the potential fraud to mitigate any losses stemming therefrom. Such a cross-entity fraud alert system may be used to mitigate refund fraud by enabling real-time or event-driven notifications and data sharing between different entities involved in a transaction. For example, fraud notifications from one entity to another, e.g., from a payment processor to a merchant or vice versa, allow both entities to become aware of the fraud attempt and take corrective action (e.g., investigating a refund request) before authorizing the request and transferring funds. While the disclosed cross-entity refund fraud mitigation techniques will be described below in the context of transactions between merchants and consumers, it should be appreciated that these techniques may be applied to transactions involving any of various types of entities.

In some embodiments, the fraud alert system and refund fraud mitigation techniques disclosed herein may be implemented as a web application or web service provided by a server over a network. The terms "web service" and "web application" are used interchangeably herein to refer broadly and inclusively to any type of web site, application, service, protocol, or framework accessible via a web browser, or other client application executed by a computing device, over a local area network, medium area network, or wide area network, such as the Internet. For example, a payment service provider may implement a fraud alert service to provide cross-entity refund fraud detection and mitigation as part of a risk assessment tool that operates alongside one or more of the service provider's existing web services. Such web services may include, for example, various payment processing services for transactions between different entities, e.g., users of the payment service provider and online merchants associated with or authorized by the service provider, as will be described in further detail below with respect to FIGS. 1-8.

FIG. 1 is a block diagram of a network communication system 100 in accordance with an embodiment of the present disclosure. System 100 includes a client device 110, a server 120, a client device 130, and a server 140, all of which are communicatively coupled to one another via a network 102. Each of devices 110 and 130 may be any type of computing device with at least one processor, local memory, display, and one or more input devices (e.g., a mouse, QWERTY keyboard, touchscreen, microphone, or a T9 keyboard). Examples of such computing devices include, but are not limited to, a mobile phone, a personal digital assistant (PDA), a computer, a cluster of computers, a set-top box, or similar type of device capable of processing instructions. Each of servers 120 and 140 may be any type of computing device, e.g., a web server or application server, capable of serving data to devices 110 and 130 over network 102. As will be described in further detail below, each of the client devices and servers in system 100 may be associated with an entity that engages in electronic or online transactions with one or more other entities via network 102.

Network 102 may be any network or combination of networks that can carry data communication. Such network can include, but is not limited to, a wired (e.g., Ethernet) or a wireless (e.g., Wi-Fi and 3G) network. In addition, network 102 may include, but is not limited to, a local area network, medium area network, and/or wide area network, such as the Internet. Network 102 may support any of various networking protocols and technologies including, but not limited to, Internet or World Wide Web protocols and/or services. Intermediate network routers, gateways, or servers may be provided between components of communication system 100 depending upon a particular application or environment.

In some embodiments, server 120 may be used by a service provider to provide a payment processing service for processing payments in connection with transactions between other entities via network 102. Such other entities may include, but are not limited to, online merchants who sell products and services via an online marketplace and users or consumers who purchase such products and services from the merchants. In FIG. 1, for example, a user 115 of device 110 may initiate a transaction for the purchase of one or more items sold by a merchant via an online marketplace or retail service provided using server 140. The online marketplace in this example may be accessed by user 115 by visiting a corresponding website through a web browser or other client application executable at device 110. The online marketplace may provide a checkout option for user 115 to select the payment processing service offered by the service provider at server 120 to complete payment for the purchase. By selecting this option, user 115 may initiate a payment transaction for transferring funds to the merchant from a specified bank account, digital wallet, or other funding source associated with an account of user 115 with the service provider. The payment processing service may assist with resolving electronic transactions through validation, delivery, and settlement of account balances between user 115 and the merchant in this example, wherein accounts may be directly and/or automatically debited and/or credited using monetary funds in a manner accepted by the banking industry.

To use the payment processing service, the service provider may require user 115 to provide authentication credentials associated with user 115's account, e.g., via a login page displayed at device 110. Server 120 may check the credentials, as received from user 115 and device 110 via network 102, against the credentials associated with user 115's account. The authentication credentials may be stored along with other relevant account information, e.g., a transaction history associated with user 115's account, in a database 125 coupled or otherwise accessible to server 120. In some implementations, a similar account authentication scheme may be employed by the merchant to authenticate user 115 for the online marketplace using server 140. The authentication credentials and other account information for an account of user 115 with the merchant may be stored in a database 145 coupled to server 140. Each of databases 125 and 145 may be any type of data store or recordable storage medium configured to maintain, store, retrieve, and update information for servers 120 and 140, respectively.

At some point after purchasing the item(s) from the merchant in the above example, user 115 may initiate a request for a refund of the purchase price. The refund request may be directed to either the payment service provider (and sent to server 120) or the merchant (and sent to server 140). It is possible that user 115 has fraudulent intentions and initiates the refund request as an attempt to commit refund fraud. User 115 may, for example, falsely claim that the item was never received or that the item was received in a defective condition to obtain a full refund of the purchase price while intending to keep the purchased item. In some cases, user 115 may conspire with a user 135 to facilitate the refund fraud. User 135 may be, for example, a refund fraud expert hired by user 115 to submit the refund request as an agent of user 115. Such a fraud expert may be a cybercriminal that offers refund fraud as a service, e.g., via an underground community accessible on the Internet (or overlay network therein) through specialized software, configurations, or authorization (commonly referred to as the "dark net" or "dark web"). User 135 in this example may use a client application (e.g., a web browser, email client, or other communication application) on device 130 to submit the refund request to the payment service provider or the merchant via network 102.

Figure 2A:
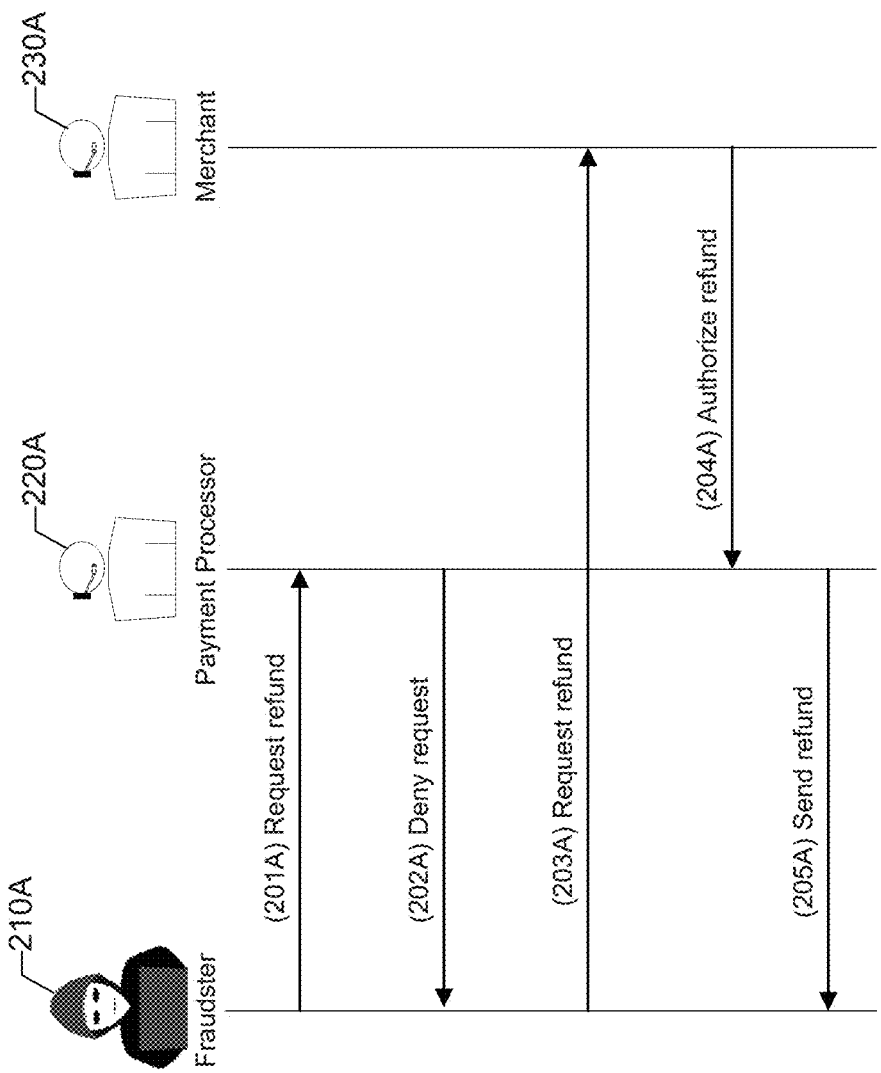
FIG. 2A illustrates an example of a refund fraud detected by a payment processor but not by a merchant.

In some embodiments, the refund request may be submitted via a customer support interface (e.g., a customer support website, a messaging interface, or interactive voice response (IVR) interface) of the payment processing service of the service provider at server 120 or the online marketplace of the merchant hosted at server 140. User 135 may use device 130 to, for example, send an email to a designated email address for customer support, communicate with a customer support representative (or a chatbot) via a chat application, or call a customer support hotline to speak directly with the customer support representative. Either user 115 or user 135 (or both users working together) may separately contact the service provider and the merchant to obtain the refund, e.g., by first contacting the service provider for the refund and then the merchant if unsuccessful. As illustrated in FIG. 2A, there may be situations in which either the merchant or payment processor, but not both, detect the fraud, and because of that, the fraud fails to be mitigated as a result.

FIG. 2A illustrates an example of a refund fraud detected by a payment service provider (or "payment processor") but not by a merchant. It is assumed for purposes of this example that refund fraud is attempted by a fraudster 210A for a transaction processed by a payment processor 220A and involving the purchase of an item from a merchant 230A. Fraudster 210A may be a user (e.g., user 115 of FIG. 1) who originally purchased the item (as a customer of merchant 230A) or the user's third-party agent (e.g., user 135 of FIG. 1), such as a refund fraud expert hired by the user, as described above. As shown in FIG. 2A, fraudster 210A first requests a refund (at 201A) from payment processor 220A. Payment processor 220A may evaluate the authenticity of the request to determine whether there is any evidence of fraud. It should be appreciated that payment processor 220A may employ any of various techniques for detecting fraud in this context. In some embodiments, payment processor 220A may detect fraud and decide to deny the request (at 202A). The decision to deny the refund request may be based on, for example, various risk factors indicating a relatively high likelihood that the refund request is fraudulent. As will be described in further detail below, such risk factors may include one or more anomalies detected in a transaction history associated with an account of the user or agent requesting the refund. Such anomalies may correspond to attributes of the current refund request and of the initial transaction between the user/purchaser and merchant 230A. Based on the decision to deny the request by payment processor 220A, fraudster 210A may submit another refund request (at 203A) for the same transaction to merchant 230A. Merchant 230A in this example may authorize the refund (at 204A) and thereby direct the payment processor to send the refund to the requestor, i.e., fraudster 210A (at 205A). In some embodiments, the refund fraud in this scenario may be mitigated using a fraud alert system, as shown in FIG. 2B.

Figure 2B:
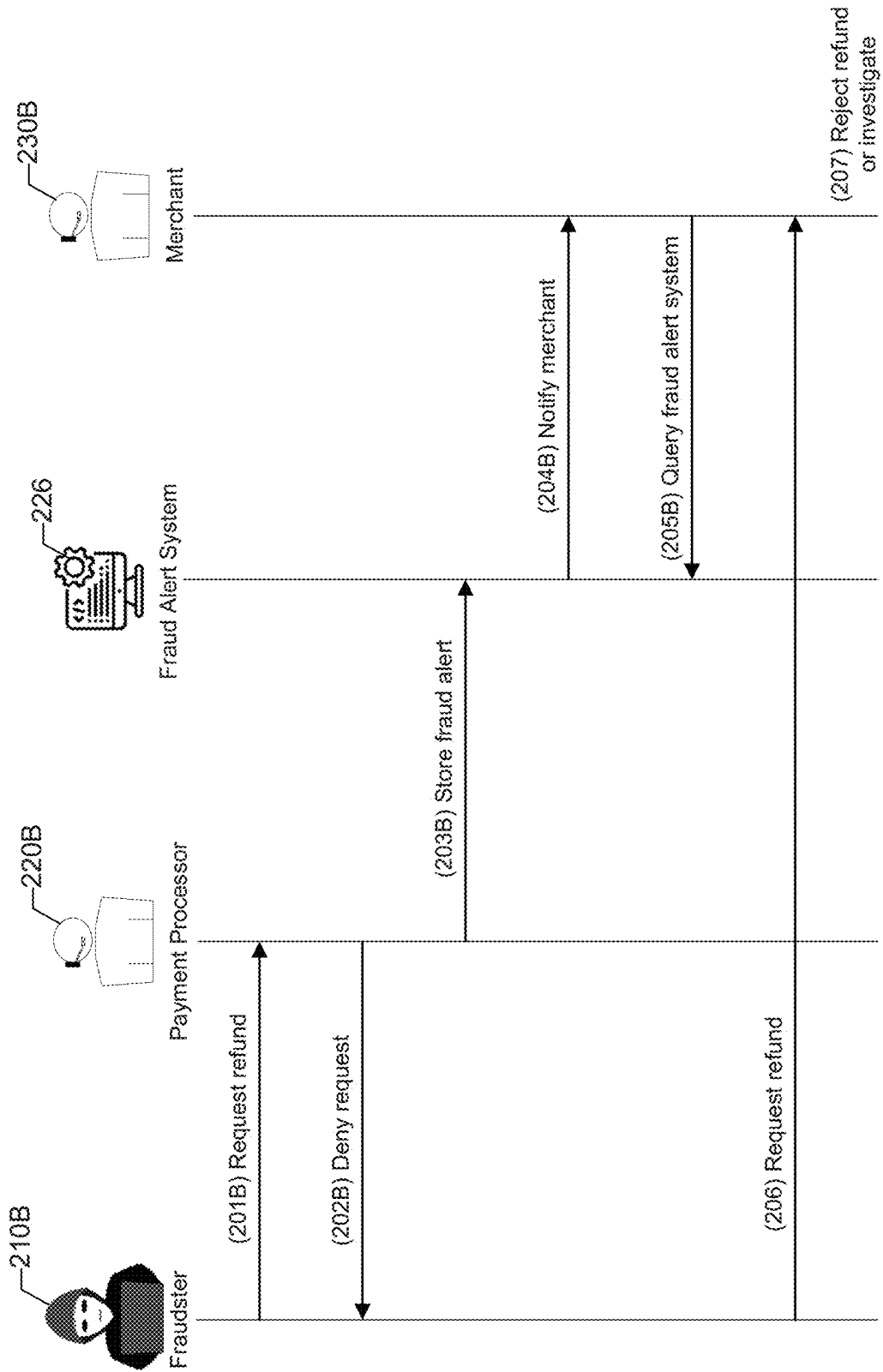
FIG. 2B illustrates an example of refund fraud mitigation using a fraud alert system that provides real-time notifications of potential refund fraud.

FIG. 2B illustrates an example of refund fraud mitigation using a fraud alert system that provides real-time notifications of potential refund fraud. Like the example in FIG. 2A described above, it is assumed for purposes of this example that the refund fraud is attempted by a fraudster 210B for a transaction processed by a payment processor 220B and involving the purchase of an item from a merchant 230B. Like fraudster 210A of FIG. 2A described above, fraudster 210B may be a user (e.g., user 115 of FIG. 1) who originally purchased the item (as a customer of merchant 230B) or a third-party agent (e.g., user 135 of FIG. 1), such as a refund fraud expert hired by the user. Also, like fraudster 210A, fraudster 210B may first request a refund from payment processor 220B (at 201B). Payment processor 220B may deny the request (at 202B), and fraudster 210B may make a second attempt at the refund fraud by submitting a subsequent refund request (at 206) to merchant 230B. Unlike the example in FIG. 2A, payment processor 220B in FIG. 2B may store the decision to deny the initial request from fraudster 210B as a fraud alert in a fraud alert system 226 (at 203B).

In some embodiments, the fraud alert may be stored as a record in a fraud alert table of a database (e.g., database 125 of FIG. 1, as described above) accessible to fraud alert system 226. Such a fraud alert database or database table may be used to store a decision history of refund requests associated with an individual user or account thereof. It should be appreciated that the transaction history and account information may be stored in a separate database or separate database table from that used to store the decision history for refund requests. Each record in the fraud alert database/table may correspond to a different one of various refund requests associated with the user or user account. The decision history may include, for example, information identifying each refund request, the original transaction, and the user(s) or user account(s) associated with the transaction and refund request. In some implementations, a unique identifier (ID) assigned to the refund request may be mapped internally by payment processor 220B with an ID of each entity associated with the refund request and transaction. For example, each record of the decision history stored in the fraud alert database may include a refund request ID, a transaction ID, a user (or user account) ID, and a merchant ID.

As described above, the refund request in some cases may be submitted by a third-party agent who is a different entity (e.g., user 135) from the entity (e.g., user 115) who initiated the original purchase transaction and who has a registered account with payment processor 220B. The third-party agent in such cases may or may not have a separate account with payment processor 220B from that of the registered user associated with the original purchase transaction. If the third-party agent does not have an account registered with the payment processor, other identifying information, e.g., an email address or other unique identifier for the third-party requestor or device thereof, may be stored instead. In some implementations, such other identifying information may be added to the account information stored for the customer, thereby linking the activities of the third-party agent to the transaction history stored for the user or customer who initiated the original purchase transaction. Accordingly, payment processor 220B in these cases may store the decision to deny the refund request received from the third-party agent in association with a transaction ID and an account ID corresponding to both the user who initiated the original purchase transaction and the third-party agent who initiated the refund request on behalf of the user.

In addition to recording the decision in the table, fraud alert system 226 may notify merchant 230B of the decision to deny the refund request (at 204B). Merchant 230B may be identified using, for example, a merchant identifier (ID) associated with the refund request and/or original purchase transaction. In some implementations, the notification may be made by fraud alert system 226 using an application programming interface (API) associated with merchant 230B. Merchant 230B may in turn use the API to query the database of fraud alerting system 226 for information related to the refund request and decision made by payment processor 220B. Merchant 230B may store the information in a local data store (e.g., database 145 of FIG. 1, as described above) for later access. For example, fraudster 210B may send a separate refund request (at 206) directly to merchant 230B, and merchant 230B may use the stored information (at 207) to reject the refund based on the prior decision by payment processor 220B or investigate further. While fraud alert system 226 is shown separately from payment processor 220B in FIG. 2B, fraud alert system 226 may be implemented by payment processor 220B as another service provided alongside the payment processing services of payment processor 220B, as will be described in further detail below with respect to FIG. 3.

Figure 3:
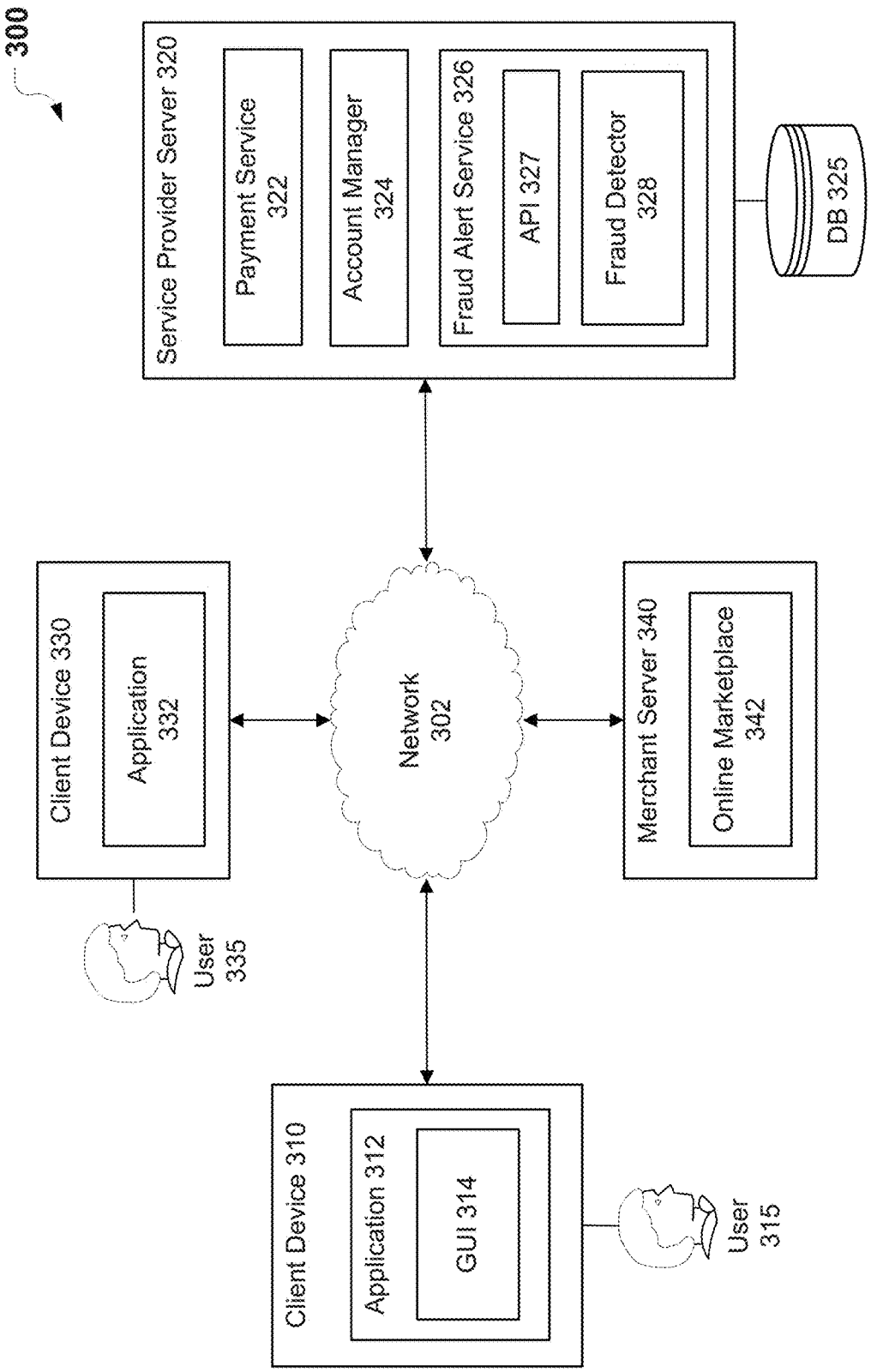
FIG. 3 is a block diagram of a system for cross-entity refund fraud mitigation in accordance with an embodiment of the present disclosure.

FIG. 3 is a block diagram of a system 300 for mitigating cross-entity refund fraud in accordance with an embodiment of the present disclosure. For discussion purposes, system 300 will be described using system 100 of FIG. 1 and the examples of FIGS. 2A and 2B, as described above, but system 300 is not intended to be limited thereto. As shown in FIG. 3, system 300 includes a client device 310, a service provider server 320, a client device 330, and a merchant server 340. Client devices 310 and 330 may be implemented using, for example, client devices 110 and 130 of FIG. 1, respectively, as described above. Servers 320 and 340 may be implemented using, for example, servers 120 and 140 of FIG. 1, respectively, as described above. Client devices 310 and 330 along with servers 320 and 340 may be communicatively coupled to one another via a network 302. Network 302 may be implemented using, for example, network 102 of FIG. 1, as described above. Like system 100 of FIG. 1, each of the client devices and servers in system 300 may be associated with an entity that engages in electronic or online transactions with one or more other entities via network 302.

As shown in FIG. 3, client device 310 executes an application 312 that a user 315 may use to access the functionality of one or more web services via network 302. Such web services may include, for example, an electronic commerce (or e-commerce) service or online marketplace 342 provided by a merchant using merchant server 340 and a payment service 322 provided by a service provider using service provider server 320. In some embodiments, the service provider may be a payment service provider or payment processor, e.g., payment processor 220A or 220B of FIG. 2A or 2B, as described above. Payment service 322 may include various payment processing services for transactions between different entities, including user 315 and the merchant associated with online marketplace 342. Such payment processing services may include, but are not limited to, payment account establishment and management, fund transfers, digital wallet services, and reimbursement or refund services. Although online marketplace 342 is shown as part of merchant server 340 in FIG. 3, it should be appreciated that embodiments are not intended to be limited thereto and that the disclosed fraud mitigation techniques may be applied to refund requests for transactions involving the purchase of items sold by the merchant through an online marketplace owned or operated by a third-party.

In some embodiments, application 312 may be a web browser or other application executable at device 310 for accessing different features of online marketplace 342 and payment service 322, e.g., through corresponding websites hosted by merchant server 340 and service provider server 320, respectively. The location of each website may be identified by a Uniform Resource Identifier (URI) or Uniform Resource Locator (URL), e.g., a web address or Internet Protocol (IP) address. User 315 may use a user input device (e.g., mouse, keyboard, or touchscreen) to interact with a graphical user interface (GUI) 314 of application 312 to navigate to the corresponding website for each service and perform various tasks. As described above, such tasks may include initiating one or more transactions for the purchase and payment of an item sold by the merchant via online marketplace 342.

In some embodiments, a transaction initiated by user 315 for the purchase of an item via online marketplace 342 may result in a separate, but related transaction to be initiated for the payment of the item via payment service 322. For example, user 315 may be redirected from online marketplace 342 (or corresponding website loaded within application 312) to a login page hosted by service provider server 320 as part of payment service 322. The login page may be displayed within GUI 314 of application 312 for user 315 to log into an account of user 315 with the service provider. Once logged in, user 315 may utilize the payment processing features of payment service 322 to complete payment for the purchase transaction initiated by user 315 with the merchant via online marketplace 342. Payment service 322 may enable purchase expenses to be directly and/or automatically debited from user 315's account via application 312.

Accordingly, payment service 322 may coordinate with online marketplace 342 to provide payment processing services over network 302 for online purchase transactions initiated by user 315 through online marketplace 342 or corresponding website hosted by merchant server 340.

In some embodiments, the features of payment service 322 may be available to only those entities (e.g., users and merchants) who have accounts registered with the service provider. In some embodiments, service provider server 320 may include an account manager 324 to maintain the accounts for such entities in a database (e.g., an account database) 325 coupled to server 320. Database (DB) 325 may be any type of data store for storing information accessible to service provider server 320. DB 325 may be implemented using, for example, database 125 of FIG. 1, as described above. In some embodiments, each registered account may be stored in DB 325 with a unique identifier and other information relevant to each account. Such account information may include, for example and without limitation, login credentials (e.g., username and password information), personal contact information (e.g., mailing address and phone numbers), banking information (e.g., bank account numbers and other information related to one or more funding sources, such as digital wallets), and other identity attributes that may be used by account manager 324 to authenticate or verify an entity's identity.

In some implementations, the attributes associated with an entity (e.g., user 315) may be based on a transaction history stored for the entity in DB 325. The transaction history may include metadata collected during one or more previous transactions processed by the service provider for the entity. Such metadata may include, for example and without limitation, information passed to service provider server 320 (and account manager 324 thereof) as part of a login, purchase, payment, or refund transaction initiated by the entity (e.g., by user 315 via application 312 at client device 310).

In some embodiments, the information collected during the previous transaction(s) may be used to create a profile of user 315 and any other entity (e.g., user 335) associated with that account. Accordingly, the metadata included in the transaction history stored in DB 325 for each account may also include profile data collected for each entity associated with the account. Such profile data may include, but is not limited to, preferred account funding and payment options, a transaction history (e.g., payment information, receipts, other details related to each previous transaction), device information, and other information collected in response to completed funding and/or payment transactions. The device information may include, for example and without limitation, Internet Protocol (IP) addresses, location data, and other information identifying the device(s) used to complete the previous transaction(s). In some embodiments, account manager 324 may use the information stored in DB 325 for each account to match profiles with individual users/entities associated with that account. In some implementations, one or more anonymization or hashing techniques may be applied to the device information or other personally identifiable information associated with a user's profile or account before such information is shared with other entities.

The transaction history and metadata thereof, including profile data and attributes, associated with an account of an entity (e.g., user 315) with the service provider may be utilized by account manager 324 to verify the authenticity of any requests received from a device (e.g., client device 310) associated with the entity. In some cases, a single account with the service provider may be associated with multiple entities. For example, a single account may be associated with user 315 and a user 335, who may be an agent of user 315. User 335 may be, for example, a refund fraud expert (like user 135 of FIG. 1, as described above) hired by user 315 to mediate refund fraud on behalf of user 315. User 335 in this example may use an application 332 (e.g., a web browser or other application like application 312) at client device 330 to access features of payment service 320 over network 302, e.g., for purposes of submitting a refund request for a transaction between user 315 and the merchant associated with online marketplace 342.

In some embodiments, the transaction history stored for each account in DB 325 may be used by a fraud alert service 326 of service provider server 320 to mitigate refund fraud, as described above. As will be described in further detail below, fraud alert service 326 may also use information collected from various other data sources, e.g., one or more data feeds from an online marketplace for fraud services, which fraud alert service 326 may use to identify known fraudsters and assess the fraud risk associated with refund requests submitted by such fraudsters or agents thereof. Fraud alert service 326 may also employ real-time alerts to notify the merchant of potential fraud and thereby mitigate the merchant's risk of fraud in cases where the merchant also receives a request for the same refund denied by the service provider.

Fraud alert service 326 may include, for example, an API 327 and a fraud detector 328. Fraud detector 328 may be used to monitor refund requests received by service provider server 320 via network 302. The refund requests may be for transactions processed by the service provider using payment service 322. Such transactions may include, for example, transactions associated with an account of user 315 with the service provider for the purchase of one or more items sold by the merchant via online marketplace 342. In some implementations, the cross-entity refund fraud detection and mitigation functions of fraud alert service 326 may operate alongside the payment processing functions of payment service 322.

For example, a refund request may be received by service provider server 320 from client device 310 for a payment processed by payment service 322 as part of a transaction involving the purchase by user 315 of one or more items from online marketplace 342 of merchant server 340. Alternatively, the refund request may be initiated by user 335 on behalf of user 315 and received by service provider server 320 from client device 330. The refund request from either client device 310 or client device 330 may be received via a customer support interface of payment service 322 of service provider server 320. As described above, the customer support interface may be, for example, a customer support website, a messaging interface, or IVR interface.

In some embodiments, the refund request received by the customer support interface of payment service 322 may be automatically forwarded to fraud alert service 326, e.g., as an initial step for processing the request before making any authorization decision, i.e., deciding whether to authorize/grant or deny the request. The refund request may include, for example, a unique identifier associated with the account of user 315 (the original purchaser involved in the transaction) with the payment service provider. Fraud alert service 326 may use this account identifier to retrieve a transaction history and other relevant account information stored in DB 325. Fraud alert service 326 may then analyze the retrieved information and generate a decision on authorization of the refund request for the transaction, as will be described in further detail below.

In some embodiments, the decision by fraud alert service 326 along with the relevant transaction details may be stored as part of a decision history of refund requests associated with user 315 or account thereof. The decision history may also be shared with authorized merchants by, for example, storing the decision history in a separate fraud alert table within DB 325 or a separate fraud alert database accessible to merchant server 340 (and other authorized merchant servers) via network 302. It should be appreciated that the transaction details or other account information shared with merchants by the service provider may exclude any personal or personally identifiable information regarding the entity or end user (e.g., user 315) associated with the account. In some embodiments, a notification of the decision may also be transmitted to merchant server 340 via network 302.

In some implementations, the notification may be transmitted to merchant server 340 using API 327. API 327 may also be used by merchant server 340 to retrieve relevant details of the refund request and transaction from DB 325 or separate fraud alert database, as described above. The fraud alert information may then be used by the merchant to make its own decision on any subsequent refund requests received by merchant server 340 for the same transaction. Any subsequent decision by the merchant may be shared with the payment service provider (e.g., using API 327), which the service provider may use to update the initial decision and improve its decision-making capability, as will be described in further detail below with respect to FIGS. 4-6.

Figure 4:
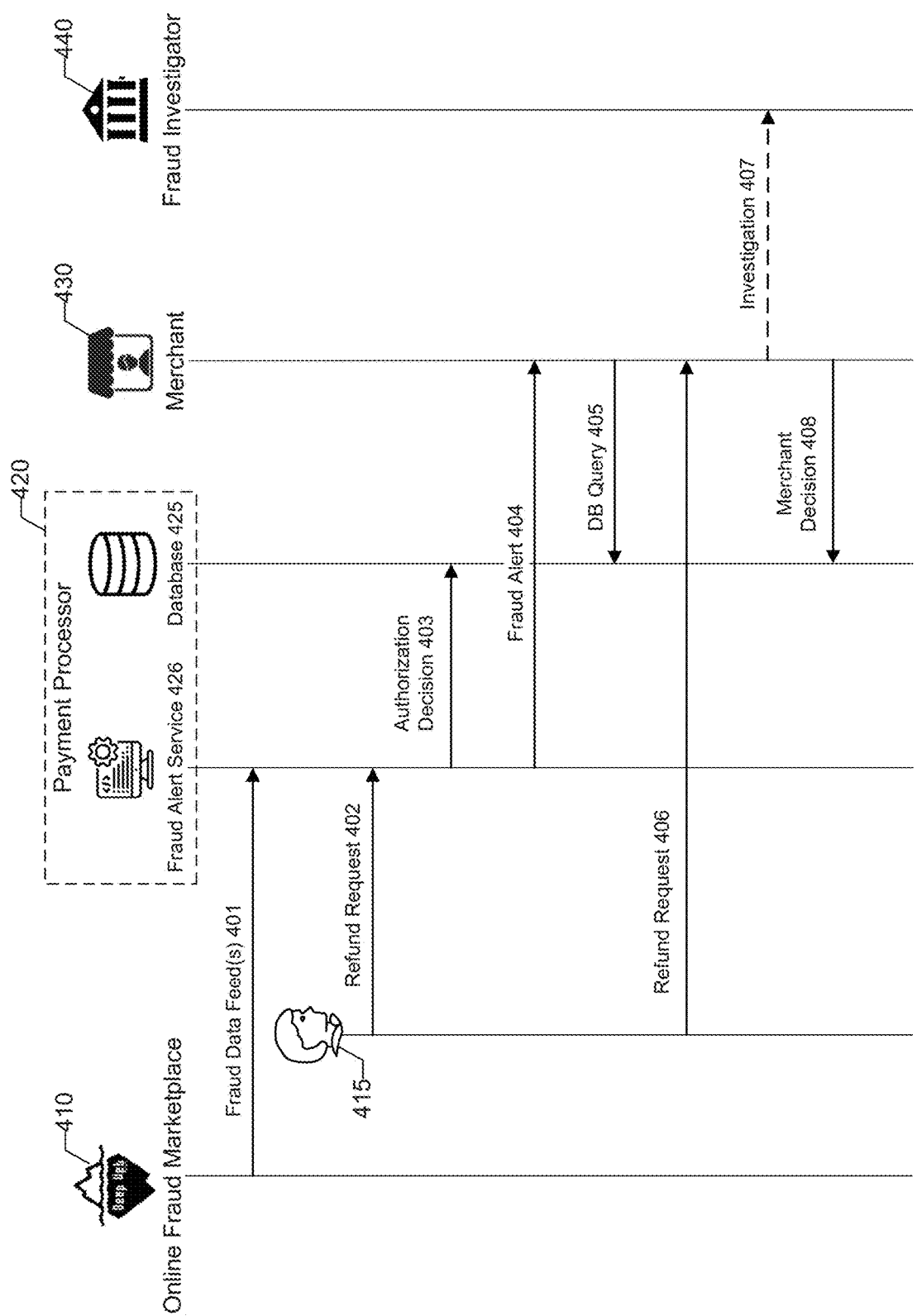
FIG. 4 illustrates an example of cross-entity refund fraud mitigation using a fraud alert system.

FIG. 4 illustrates an example of cross-entity refund fraud mitigation using a fraud alert system. The fraud alert system in this example may be implemented as a fraud alert service 426 of a payment processor 420, e.g., using fraud alert service 326 of service provider server 320 of FIG. 3, as described above. Fraud alert service 426 may be used to mitigate the risk of refund fraud associated with transactions processed by payment processor 420. The transactions may include, for example, transactions between users of payment processor 420 and a merchant 430 for the purchase of items sold by merchant 430 to the users via an online marketplace (e.g., online marketplace 342 of FIG. 3, as described above). The users in this example may have accounts registered with payment processor 420, as described above.

In some embodiments, fraud alert service 426 may collect information on fraudulent users and activities (or "fraud data") from various data sources to evaluate the authenticity of refund requests received by payment processor 420 for such transactions. As shown in FIG. 4, such data sources may include, for example, one or more fraud data feed(s) 401 that fraud alert service 426 may use to monitor an online fraud marketplace 410 for bad actors offering their services for refund fraud. Online fraud marketplace 410 may include, for example, one or more online forums or websites on the darknet (also referred to as the "dark web" or "deep web") that provide users with access to an underground market of informational guides and contacts to facilitate refund fraud.

In some embodiments, fraud alert service 426 may parse fraud data feed(s) 401 for information, such as through blacklists or notifications, identifying known fraudsters who provide refund fraud services on online fraud marketplace 410. In some implementations, fraud alert service 426 may use the information to generate and maintain a list of known fraudsters along with a profile of each fraudster on the list. The profile may include any available information that may be used to identify the fraudster (and any refund requests originating therefrom). Examples of such profile information include, but are not limited to, a legal name or alias, personal contact information (e.g., a physical mailing address, an email address, phone number, etc.), a network location or address (e.g., an Internet Protocol (IP) address associated with a device of the fraudster), a browser or device fingerprint (e.g., language and localization preferences, keyboard layout, time zone, cookie settings, browser version, operating system version, and other unique browser or device characteristics), and a geographic location (e.g., city and state associated with the fraudster or device thereof).

In some embodiments, fraud alert service 426 may store the list of fraudsters along with their respective profiles in a database 425, e.g., as records in one or more database tables. Database 425 may be implemented using, for example, database 325 of FIG. 3, as described above. In some implementations, database 425 may also be used to store account information for registered users of payment processor 420, e.g., in a separate table of accounts within database 425. Alternatively, the account information may be stored in a separate database of payment processor 420 from database 425.

The fraudster list and profiles stored in database 425 may be used by fraud alert service 426 to appropriately assess the fraud risk of a refund request received by payment processor 420. For instance, upon receiving a refund request 402 from a user 415, fraud alert service 426 of payment processor 420 may identify user 415 as a known fraudster based on a corresponding profile stored in database 425. User 415 may be, for example, a refund fraud expert hired by a registered user of payment processor 420 (and customer of merchant 430) to mediate refund fraud for a transaction between the registered user/customer and merchant 430, as described above. The profile of user 415 in this example may be based on the information found on online fraud marketplace 410, as described above.

In cases where no information for user 415 was found on online fraud marketplace 410, a profile of user 415 as a known or potential fraudster may still exist in database 425 based on other information available to fraud alert service 426. Such other information may include, for example, evidence of suspicious activity associated with previous transactions involving user 415. A record of the previous transactions may be stored in a table of database 425 (or separate account database) as part of a transaction history associated with user 415's profile. The transaction history may reveal, for example, that user 415 has mediated (or is currently mediating) refund requests for multiple individuals, which is often deemed suspicious.

In some embodiments, the transaction history associated with user 415's profile may also include voice data captured by a voice authentication system (not shown) of fraud alert service 426. The voice authentication system may be used by fraud alert service 426 to detect fraudulent calls based on analyzing voice characteristics of user 415 and other callers who communicate with customer service agents via a customer support interface of payment processor 420, as described above. In some embodiments, using various voice analysis techniques disclosed herein, the voice authentication system may authenticate a caller as a legitimate user associated with a user account of the online service provider and also determine if the caller has called before on multiple other user accounts of the online service provider. When the voice authentication system has determined that the caller is suspicious (e.g., that the caller is not a legitimate user associated with the user account and/or that the caller is linked to previous call(s) associated with other user account), the voice authentication system may provide real-time feedback by alerting an automated chat module (e.g., a chatbot) or customer service agents of the online service provider of such suspicious activity. In some embodiments, the voice authentication system may leverage various aspects of speech recognition and voice identification technology to provide a framework for a two-stage procedure that first verifies the identity of a caller and then checks if the same caller has previously called regarding a refund request on a different account not belonging to the caller. This framework can identify fraudsters, generate a voice blacklist, and alert customer service agents in real time to mitigate any security lapse.

To facilitate analyses of voice characteristics of incoming callers, the voice authentication system may generate multiple machine learning-based voice models that represent variations of voices associated with different user accounts of the online service provider. In some embodiments, the voice authentication system may generate multiple generic voice models, where each of the generic voice models may correspond to a particular cross-section of demographics. Examples of the demographics may include gender, country of origin (e.g., accent), age, among others. An example cross-section can be a young male (e.g., younger than 30 years old) from France, or an elderly female (e.g., older than 60 years old) from New York. There can be a number of generic voice models generated to represent individual attributes and selected cross-sections that together encompass the widest possible group of individuals. In some embodiments, the voice authentication system may generate the machine learning-based generic voice models based on different combinations of a particular subset of the demographics attributes, such as gender, age, and accent. The machine learning-based voice models may be configured to identify age groups in a binary manner such as old/young, or categorically by dividing the different ages into different age groups.

In some embodiments, fraud alert service 426 may use the transaction history and other information associated with user 415's profile to determine a risk score representing a risk of fraud associated with user 415 and/or the refund request 402 received from user 415. The risk score may be determined based on anomalies detected in the transaction history associated with user 415 (or profile thereof). Fraud alert service 426 may detect such anomalies by analyzing metadata extracted from the transaction history for one or more previous refund requests associated with user 415. Such anomalies may correspond to ambiguities or discrepancies in various attributes or features of the previous refund requests. Examples of such anomalies include (but are not limited to): changes in a caller's voice, accent, or phone number; discrepancies or errors in the name, email address, or physical mailing address; a mismatch between the shipping address and the return address; a mismatch between the shipping address and the device location (e.g., the device location or network address does not match the shipping address or keeps changing frequently); and the refund request frequency exceeding a predetermined frequency threshold. Fraud alert service 426 may use the risk score to generate an authorization decision 403 for the refund request from user 415. The authorization decision 403 may be, for example, a denial or rejection of the refund request 402 if the risk score determined for user 415 exceeds a risk tolerance threshold.

Alternatively, the authorization decision 403 may be based on a decision history of refund requests associated with the registered user/customer (or account thereof) involved in the original purchase transaction for which the refund is being requested. The decision history may be stored in database 425, e.g., as part of a transaction history associated with an account of the customer with payment processor 420. For example, fraud alert service 426 may retrieve the decision history from database 425 and generate a decision to decline the refund request from user 415 based on identifying one or more decisions in the decision history to decline one or more previous refund requests from the customer. It should be appreciated that each of the previous refund request(s) may have been submitted directly by the customer or indirectly by an agent (e.g., user 415) on behalf of the customer. In some implementations, the decision to decline the current refund request 402 from user 415 may be based on identifying, from the decision history, a number of decisions to decline previous refund requests that exceeds a predetermined maximum threshold for declined refund requests over a predetermined time period. The decision history in database 425 may be updated to include the authorization decision 403 for the refund request 402.

In some embodiments, the authorization decision 403 may be based on a combination of the decision history of refund requests associated with the customer and the risk score determined for user 415 (as the customer's agent in this example). In a case where fraud alert service 426 has no prior history or profile stored for user 415, a risk score may be generated for a refund request received from user 415 based on the decision history associated with the customer (or account thereof). If the customer in this case has a suspicious transaction history or decision history of refund requests, the suspicious history may negatively impact (i.e., increase) the risk score determined for the customer or user 415. For example, a profile of user 415 may be added to the list of potential fraudsters stored in database 425, as described above, based on the suspicious history of the customer for whom user 415 is mediating a current refund request (e.g., refund request 402). This may increase the risk score for not only the current refund request but also for any future requests received from user 415. A relatively high risk score, e.g., above a predetermined risk tolerance threshold, may increase the likelihood that such future refund requests from user 415 are denied.

As shown in FIG. 4, the authorization decision 403 generated for refund request 402, e.g., a decision to decline refund request 402, may be stored in an appropriate table of database 425, e.g., corresponding to the decision history of refund requests associated with the customer (or account thereof with payment processor 420). A fraud alert 404 may also be transmitted to notify merchant 430 of the authorization decision 403. In some embodiments, the notification may be transmitted to a server of merchant 430 (e.g., merchant server 340 of FIG. 3, as described above) using an API (e.g., API 327 of FIG. 3, as described above) of fraud alert service 426. In response to the notification (fraud alert 404), merchant 430 may initiate a database (DB) query 405 to access the appropriate table including the authorization decision 403 stored in database 425. In some implementations, the notification (fraud alert 404) from fraud alert service 426 may include a link that merchant 430 can use to directly access or retrieve the authorization decision 403 stored in database 425. In some embodiments, fraud alert 404 may be sent to merchant 430 once the authorization decision 403 has been made. Alternatively, fraud alert 404 may be sent based on other triggers, such as receiving a request from merchant 430 (e.g., when merchant 430 receives a refund request directly from user 415, as will be described in further detail below).

As shown in FIG. 4, user 415 may submit a refund request 406 directly to merchant 430, e.g., after user 415 is informed of the authorization decision 403 by payment processor 420 to decline refund request 402. Merchant 430 may decide whether to authorize or decline refund request 406 based on the authorization decision 403 retrieved from database 425. For example, merchant 430 may choose to decline refund request 406 based on the prior decision (403) by fraud alert service 426 to decline refund request 402. Merchant 430 may also have the option to launch an investigation 407. Thus, in some cases, merchant 430 may choose to launch investigation 407 to determine the authenticity of refund request 406 based on the prior decision to decline refund request 402. The investigation 407 may be conducted using a third-party service provided by a fraud investigator 404, as shown in FIG. 4.

Once a decision is made with respect to refund request 406, e.g., based on the outcome of investigation 407, merchant 430 may update the decision history in database 425 to include a merchant decision 408. For example, merchant decision 408 may be added to an existing record in the decision history of refund requests for the original purchase transaction associated with the customer (or account thereof) in database 425. Each record in the updated decision history (or row of the corresponding table in database 425) may include, for example, a unique identifier (ID) for the original purchase transaction, a merchant ID corresponding to merchant 430, the decision 403 by fraud alert service 426 for refund request 402, and the merchant decision 408. In some embodiments, fraud alert service 426 may periodically review the updated decision history to improve its decision-making capability. For instance, if the investigation output complements the initial decision (fraud in both cases), then fraud alert service 426 may increase the risk score for the customer or user 415 (the mediating agent in this example). If the investigation decision contradicts the initial decision, the risk score may be lowered accordingly. This allows fraud alert service 426 to remove false positives from its fraud risk assessment of refund requests and thereby improve the accuracy of its cross-entity refund fraud mitigation capabilities.

Figure 5:
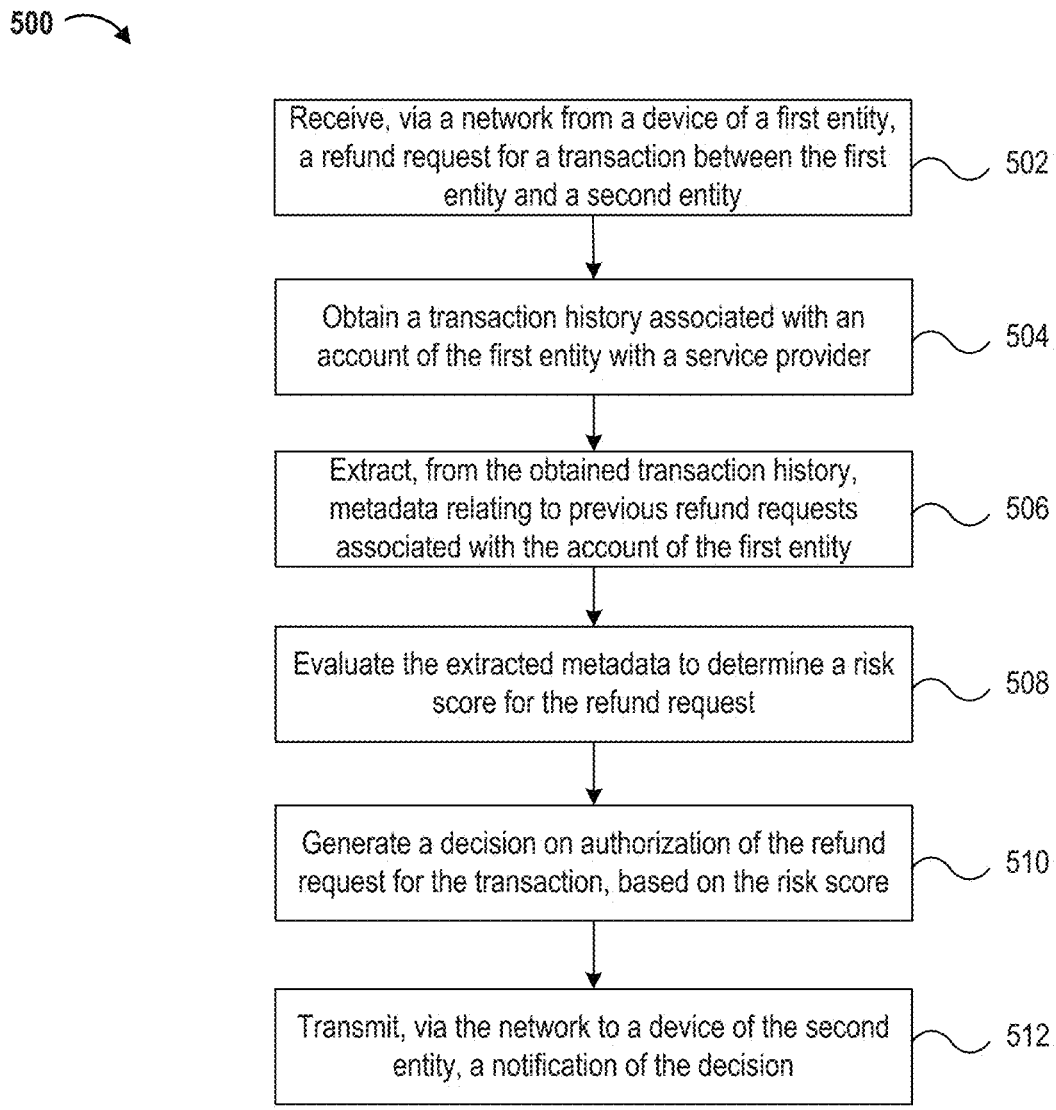
FIG. 5 is a flow diagram of another process for cross-entity refund fraud mitigation in accordance with an embodiment of the present disclosure.

FIG. 5 is a flow diagram of a process 500 for cross-entity refund fraud mitigation in accordance with an embodiment of the present disclosure. For discussion purposes, process 500 will be described using systems 100 and 300 of FIGS. 1 and 3, respectively, along with the example of FIG. 4, as described above, but process 500 is not intended to be limited thereto. For example, process 500 may be performed by fraud alert service 326 of service provider server 320 in system 300 of FIG. 3 or fraud alert service 426 of payment processor 420 of FIG. 4, as described above.

As shown in FIG. 5, process 500 begins in block 502, which includes receiving, via a network from a device of a first entity, a refund request for a transaction between the first entity and a second entity. The first entity may be, for example, user 315 of client device 310 of FIG. 3, as described above. The second entity may be, for example, the merchant associated with server 140 of FIG. 1, online marketplace 342 of merchant server 340 in FIG. 3, and/or merchant 430 of FIG. 4, as described above. The transaction in this example may relate to the purchase of one or more items by user 315 from online marketplace 342 of merchant server 340, as described above. The payment for the transaction may have been processed by a service provider, for example, using payment service 322 of service provider server 320 of FIG. 3, as described above.

In block 504, a transaction history associated with an account of the first entity (e.g., user 315) with the service provider is obtained. In block 506, metadata relating to previous refund requests processed for previous transactions associated with the account of the first entity may be extracted from the obtained transaction history. The extracted metadata may include, for example, information pertaining to various attributes of the previous refund requests and processed transactions associated with the account of the first entity.

Process 500 may then proceed to block 508, which includes evaluating the metadata extracted in block 506 to determine a risk score for the refund request received in block 502 for the transaction between the first and second entities. The risk score may indicate a risk of fraud associated with the refund request. In some embodiments, the evaluation in block 508 may include analyzing the metadata to detect anomalies in the previous refund requests processed for the previous transactions associated with the account of the first entity. Examples of anomalies that may be detected from the analysis include, but are not limited to, a mismatch between a shipping address associated with the transaction and a return address associated with the refund request, a mismatch between the shipping address and a device location associated with the first entity, and a refund request frequency associated with the first entity exceeding a predetermined frequency threshold. Attributes of the previous refund requests that correspond to the detected anomalies may be identified and applied as inputs to a risk analysis model. Examples of attributes corresponding to the anomalies listed above include, but are not limited to, the shipping address for the transaction, the return address for the refund request, the device location associated with the first entity, and the refund request frequency associated with the first entity. The risk score for the refund request received in block 502 for the transaction may then be determined based on an output of the risk analysis model.

In some embodiments, the risk analysis model may be a machine learning model that is trained to detect fraudulent transactions based on training data obtained from different data sources. The different data sources may include, for example, transaction records from multiple accounts of different entities with the service provider and one or more data feeds from a marketplace for refund fraud services (e.g., online fraud marketplace 410 of FIG. 4, as described above).

In block 510, the risk score may be used to generate a decision on authorization of the refund request for the transaction. In some embodiments, the decision on authorization of the refund request for the transaction may be stored in a fraud alert database (e.g., database 325 of FIG. 3 or database 425 of FIG. 4, as described above). The authorization decision may be stored, for example, as part of a decision history of refund requests associated with the account of the first entity. The fraud alert database may be accessible to the second entity for subsequent refund requests associated with the account of the first entity.

In block 512, a notification of the decision generated in block 510 (e.g., as stored in the fraud alert database) may be transmitted via the network to a device of the second entity. In some embodiments, the second entity may retrieve the decision history from the fraud alert database in response to the notification. In some implementations, the decision history stored in the fraud alert database may be accessible to the second entity via an API (e.g., API 327 of FIG. 3, as described above) of the service provider. The second entity (e.g., the merchant) may store the decision history locally (e.g., in database 145 of merchant server 145 of FIG. 1, as described above) for making its own authorization decisions with respect to subsequent refund requests that it receives for the same transaction with the first entity. It should be appreciated that the subsequent refund requests may be associated with the account of the first entity but include one or more refund requests submitted by a third entity (e.g., user 335 of FIG. 3, as described above). The third entity may be, for example, a refund fraud expert hired by the original user, as described above.

In some embodiments, the second entity may also update the decision history stored in the fraud alert database to include its own authorization decision made for a subsequent refund request and notify the service provider of the update. The service provider in this example may then obtain the updated decision history including the authorization decision made by the second entity from the fraud alert database. The service provider may then update the training data for the risk analysis model (e.g., the machine learning model) based on the authorization decision made by the second entity for the subsequent refund request and retrain the model using the updated training data. This may improve the model's fraud detection capabilities for subsequent refund requests associated with the first entity, e.g., by adjusting (increasing or decreasing) the risk score output by the model for such requests according to the decision by the second entity. For example, the risk score may be increased if the second entity also declines the subsequent refund request (and thus confirms any fraud detected by the first entity). Conversely, the risk score may be decreased if the second entity approves the subsequent refund request (and thus disproves any fraud detected by the first entity).

Figure 6:
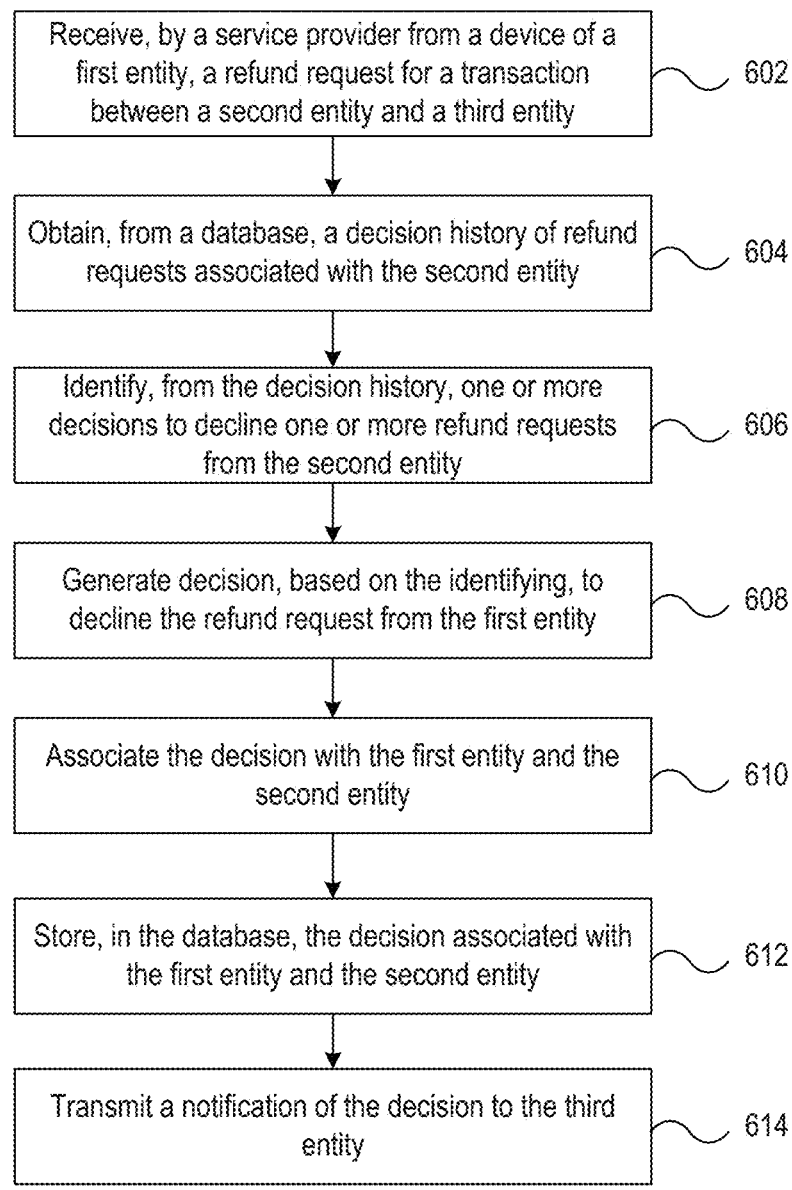
FIG. 6 is a flow diagram of yet another process for cross-entity refund fraud mitigation in accordance with an embodiment of the present disclosure.

FIG. 6 is a flow diagram of another process 600 for cross-entity refund fraud mitigation in accordance with an embodiment of the present disclosure. For discussion purposes, process 600 will be described using system 300 of FIG. 3, as described above, but process 600 is not intended to be limited thereto. Process 600 may be performed by, for example, fraud alert service 326 of service provider server 320 in system 300 of FIG. 3, as described above.

As shown in FIG. 6, process 600 begins in block 602, which includes receiving, by a service provider via a network from a device of a first entity, a refund request for a transaction between a second entity and a third entity. The first entity in this example may be a fraud expert (e.g., user 335 of FIG. 3, as described above) hired by the second entity (e.g., user 315 of FIG. 3, as described above) to mediate refund fraud. The transaction may be a payment transaction (e.g., as processed by payment service 322 of FIG. 3, as described above) for a purchase made by the second entity via an online marketplace (e.g., online marketplace 342 of FIG. 3, as described above) of the third entity (e.g., the merchant associated with online marketplace 342 of FIG. 3).

In block 604, a decision history of refund requests associated with the second entity may be obtained from a database (e.g., database 325 of FIG. 3, as described above). From the decision history, one or more decisions to decline one or more refund requests from the second entity may be identified in block 606.

In block 608, a decision to decline the refund request from the first entity may be generated based on the identifying in block 606. In some implementations, block 608 may also include generating referrals for investigation or manual review of the refund request, generating referrals to law enforcement, and making one or more changes to the refund request (e.g., changing a destination of the refund so that funds are securely held during an investigation or review). Process 600 may then proceed to block 610, which includes associating the decision with the first entity and the second entity. In some embodiments, block 610 may include associating the decision with unique identifiers (IDs) corresponding to the first and second entities. The IDs of the first and second entities may also be associated with an account of the second entity with the service provider. In some implementations, the ID of the first entity may also correspond to a profile of the first entity, e.g., as generated by the service provider for a list of potential fraudsters, as described above.

In block 612, the decision associated with the first entity and the second entity may be stored in the database. This may include, for example, updating the decision history obtained in block 604 for the second entity to include the decision and the ID of the first entity. In block 614, a notification of the decision may be transmitted to the third entity. As described above, the third entity (e.g., the merchant associated with online marketplace 342 of FIG. 3) may then use the decision to make its own decision with respect to a subsequent refund request received from either the first entity or the second entity.

While the discussion above focused on the refund request first being received by the service provider, payment processor, or fraud alert service, the initial refund request may instead be received by the merchant or seller of the good or service. In such a case, similar operations and processes occur to mitigate refund fraud. For example, the merchant may deny the refund request for similar reasons as the service provider described above and then transmit the information associated with the denial to the service provider, a database accessible by the service provider and other entities (such as another payment processor or another merchant), or other service provider or entity that may later receive the same refund request (i.e., a later refund request for the same transaction) or a different refund request (for a different transaction) from the same refund requester. As such, if another entity later receives a refund request for the same transaction as the earlier refund request denied by the merchant, the other entity may be able to use that denial data to deny the later request or perform an additional investigation before approving the later request. The database can then be updated with the other entity's decision.

Figure 7:
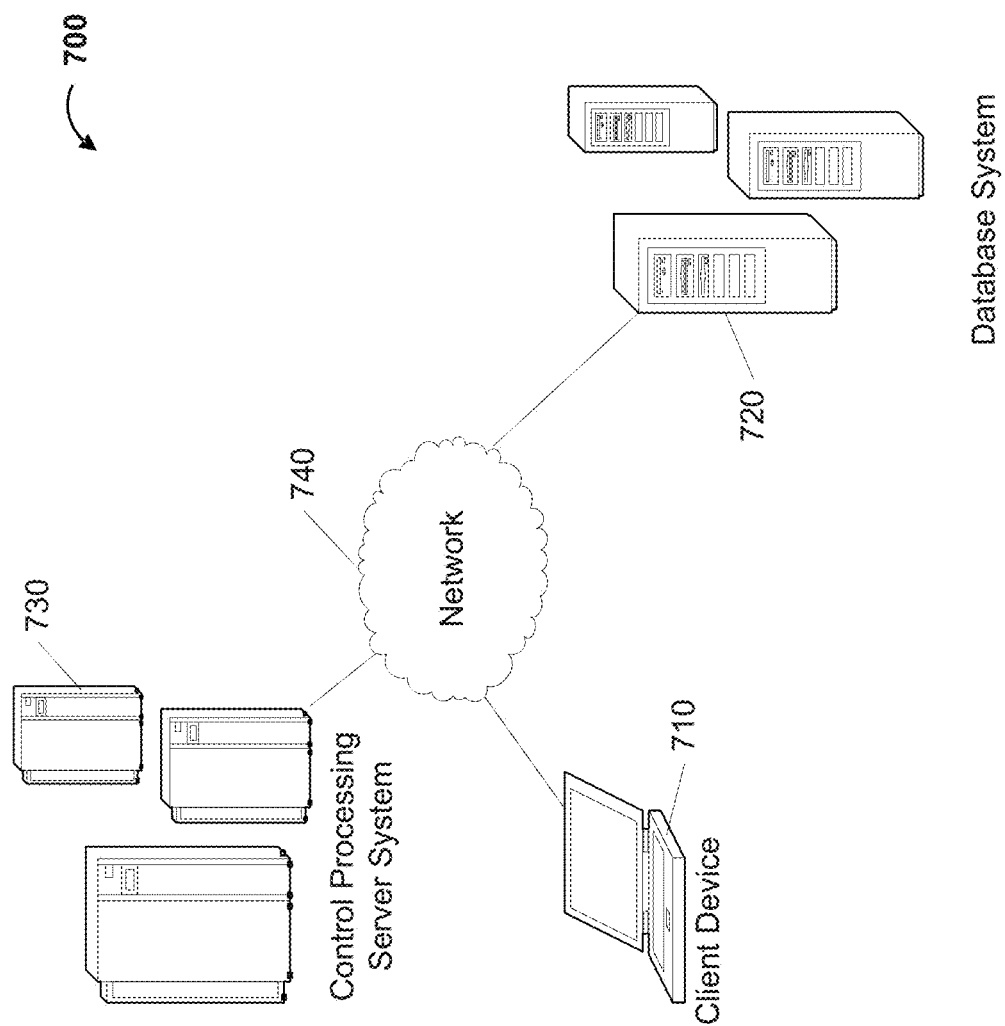
FIG. 7 is a block diagram of a distributed client-server system in which embodiments of the present disclosure may be implemented.

FIG. 7 is a block diagram of a distributed client-server system 700 in which embodiments of the present disclosure may be implemented. The system 700 may include at least one client device 710, at least one database system 720, and/or at least one server system 730 in communication via a network 740. It will be appreciated that the network connections shown are illustrative and any means of establishing a communications link between the computers may be used. The existence of any of various network protocols such as TCP/IP, Ethernet, FTP, HTTP, and the like, and of various wireless communication technologies such as GSM, CDMA, Wi-Fi, and LTE, is presumed, and the various computing devices described herein may be configured to communicate using any of these network protocols or technologies. Any of the devices and systems described herein may be implemented, in whole or in part, using one or more computing systems described with respect to FIG. 7.

Client device 710 may access server applications and/or resources using one or more client applications (not shown) as described herein. Client device 710 may be a mobile device, such as a laptop, smart phone, mobile phones, or tablet, or computing devices, such as a desktop computer or a server, wearables, embedded devices. Alternatively, client device 710 may include other types of devices, such as game consoles, camera/video recorders, video players (e.g., incorporating DVD, Blu-ray, Red Laser, Optical, and/or streaming technologies), smart TVs, and other network-connected appliances, as applicable.

Database system 720 may be configured to maintain, store, retrieve, and update information for server system 730. Further, database system may provide server system 730 with information periodically or upon request. In this regard, database system 720 may be a distributed database capable of storing, maintaining, and updating large volumes of data across clusters of nodes. Database system 720 may provide a variety of databases including, but not limited to, relational databases, hierarchical databases, distributed databases, in-memory databases, flat file databases, XML databases, NoSQL databases, graph databases, and/or a combination thereof.

Server system 730 may be configured with a server application (not shown) that is capable of interfacing with client application and database system 720 as described herein. In this regard, server system 730 may be a standalone server, a corporate server, or a server located in a server farm or cloud-computer environment. According to some examples, server system 730 may be a virtual server hosted on hardware capable of supporting a plurality of virtual servers.

Network 740 may include any type of network. For example, network 740 may include a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies.

The data transferred to and from various computing devices in a system 700 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 700. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 700 in front of one or more computing devices such that any external devices may communicate directly with the specialized hardware.

Figure 8:
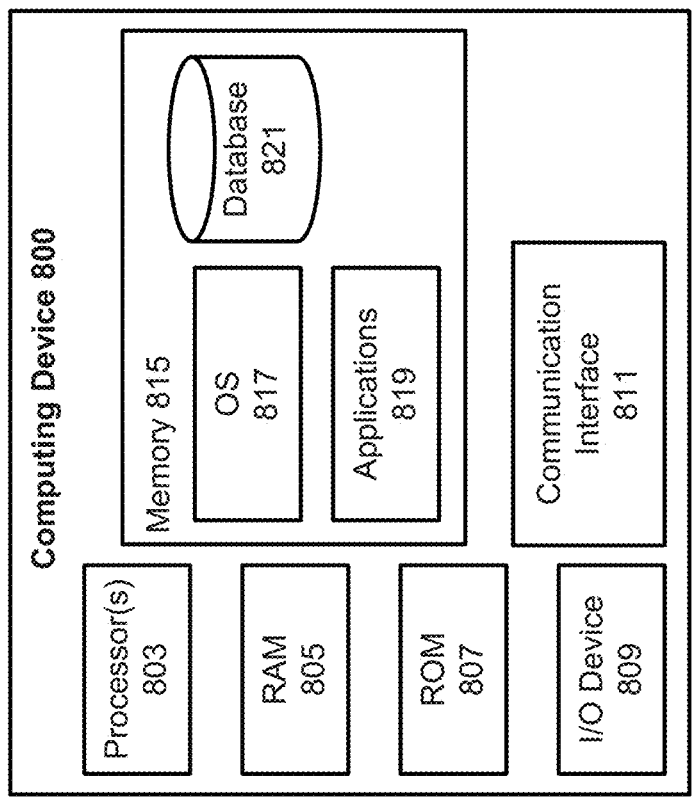
FIG. 8 is a block diagram of a computing device in which embodiments of the present disclosure may be implemented.

FIG. 8 is a block diagram of a computing device 800 in which embodiments of the present disclosure may be implemented. Computing device 800 that may be used with one or more of the computational systems is described. The computing device 800 may include a processor 803 for controlling overall operation of the computing device 800 and its associated components, including RAM 805, ROM 807, input/output (I/O) device 809, communication interface 811, and/or memory 815. A data bus may interconnect processor(s) 803, RAM 805, ROM 807, memory 815, I/O device 809, and/or communication interface 811. In some embodiments, computing device 800 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 809 may include a microphone, keypad, touch screen, and/or stylus motion, gesture, through which a user of the computing device 800 may provide input, and may also include one or more of a speaker for providing audio output and a video display device for providing textual, audiovisual, and/or graphical output. Software may be stored within memory 815 to provide instructions to processor 803 allowing computing device 800 to perform various actions. For example, memory 815 may store software used by the computing device 800, such as an operating system 817, application programs 819, and/or an associated internal database 821. The various hardware memory units in memory 815 may include volatile and nonvolatile, removable and non-removable media implemented in any method or technology for storage of information such as computer-readable instructions, data structures, program modules, or other data. Memory 815 may include one or more physical persistent memory devices and/or one or more non-persistent memory devices. Memory 815 may include, but is not limited to, random access memory (RAM) 805, read only memory (ROM) 807, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 803.

Communication interface 811 may include one or more transceivers, digital signal processors, and/or additional circuitry and software for communicating via any network, wired or wireless, using any protocol as described herein.

Processor 803 may include a single central processing unit (CPU), which may be a single-core or multi-core processor, or may include multiple CPUs. Processor(s) 803 and associated components may allow the computing device 800 to execute a series of computer-readable instructions to perform some or all of the processes described herein. Although not shown in FIG. 8, various elements within memory 815 or other components in computing device 800, may include one or more caches, for example, CPU caches used by the processor 803, page caches used by the operating system 817, disk caches of a hard drive, and/or database caches used to cache content from database 821. For embodiments including a CPU cache, the CPU cache may be used by one or more processors 803 to reduce memory latency and access time. A processor 803 may retrieve data from or write data to the CPU cache rather than reading/writing to memory 815, which may improve the speed of these operations. In some examples, a database cache may be created in which certain data from a database 821 is cached in a separate smaller database in a memory separate from the database, such as in RAM 805 or on a separate computing device. For instance, in a multi-tiered application, a database cache on an application server may reduce data retrieval and data manipulation time by not needing to communicate over a network with a back-end database server. These types of caches and others may be included in various embodiments and may provide potential advantages in certain implementations of devices, systems, and methods described herein, such as faster response times and less dependence on network conditions when transmitting and receiving data.

Although various components of computing device 800 are described separately, functionality of the various components may be combined and/or performed by a single component and/or multiple computing devices in communication without departing from the invention.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more hardware processors; and
a non-transitory memory having stored therein instructions that are executable by the one or more hardware processors to cause the system to perform operations comprising:
  receiving, via a first network from a first device, a first refund request associated with a transaction between a first entity and a second entity, wherein the first refund request comprises voice data associated with a user of the first device;
  extracting voice features corresponding to the user of the first device based on the voice data;
  generating, using a plurality of machine learning-based voice models representing variations of voices associated with a plurality of accounts with a service provider and based on the voice features, an indication of whether the user of the first device is associated with an account of the first entity;
  obtaining a transaction history associated with the account of the first entity, wherein the transaction history comprises at least one transaction between the first entity and a third entity different from the second entity;
  extracting, from the obtained transaction history, metadata relating to a plurality of refund requests processed for transactions previously conducted through the account of the first entity;
  determining, using a machine learning-based risk analysis model, a risk score for the first refund request based on the extracted metadata, the risk score indicating a risk of fraud associated with the first refund request;
  generating a first decision on whether to authorize the first refund request associated with the transaction based on the risk score;
  transmitting, via a second network to a second device of the second entity, a notification of the first decision;
  accessing a database that is accessible by the second entity and the third entity;
  storing the first decision in the database;
  obtaining, from the database, a decision history of refund requests associated with the account of the first entity;
  identifying, from the decision history, a second decision that has been provided by the second entity for a second refund request associated with the transaction, wherein the second decision is different from the first decision generated by the system for the first refund request;
  generating a first training data set for training the machine learning-based risk analysis model based on the first decision and the second decision, wherein the first training data set comprises attributes associated with the transaction and a first label representing the first decision;
  updating the first training data set based on the second decision, wherein the updating comprises modifying the first label to represent both of the first decision and the second decision;
  generating at least a second training data set based on refund decision data obtained from different data sources, wherein the different data sources include transaction records associated with the plurality of accounts with the service provider and one or more data feeds from a marketplace associated with refund fraud services; and training the machine learning-based risk analysis model using the first training data set and the at least the second training data set.

2. The system of claim 1, wherein the determining the risk score comprises:

detecting one or more anomalies in the plurality of refund requests based on analyzing the metadata;

identifying one or more attributes of the plurality of refund requests that correspond to the one or more anomalies;

providing the one or more attributes as one or more inputs to the machine learning-based risk analysis model; and determining, based on an output of the machine learning-based risk analysis model, the risk score for the first refund request.

3. The system of claim 2, wherein the one or more attributes include one or more of: a shipping address, a return address, a device location associated with the first device, or a refund request frequency associated with the first entity, and wherein the one or more anomalies include one or more of: a mismatch between the shipping address and the return address, a mismatch between the shipping address and the device location, or the refund request frequency exceeding a predetermined frequency threshold.

4. The system of claim 1, wherein the operations further comprise generating a third training data set corresponding to the at least one transaction and provided by the third entity.

5. The system of claim 1, wherein the database further stores one or more refund requests associated with the account and submitted by the third entity.

6. A method comprising:

providing, by a service provider server, a database that is accessible by a plurality of entities;

receiving, by the service provider server via a network from a first device of a first entity, a first refund request for a transaction between a second entity and a third entity;

obtaining, from the database, a decision history of refund requests associated with the second entity;

identifying, by the service provider server and from the decision history, one or more decisions to decline one or more refund requests associated with the second entity;

generating, using a machine learning model, a first decision on whether to authorize or decline the first refund request from the first entity based on the one or more decisions;

associating the first decision with the transaction between the second entity and the third entity;

storing, by the service provider server and in the database, the first decision associated with the transaction between the second entity and the third entity, wherein the database is accessible by the third entity;

obtaining, by the service provider server and from the database, a second decision that has been provided by the third entity, wherein the second decision was made by the third entity for a second refund request associated with the transaction, and wherein the second decision is different from the first decision generated by the service provider server for the first refund request;

generating, by the service provider server, a first training data set for training the machine learning model based on the first decision and the second decision, wherein the first training data set comprises attributes associated with the transaction and a first label representing the first decision;

updating, by the service provider server, the first training data set based on the second decision, wherein the updating comprises modifying the first label to represent both of the first decision and the second decision;

generating, by the service provider server, at least a second training data set based on refund decision data obtained from different data sources, wherein the different data sources include transaction records associated with the plurality of accounts with the service provider and one or more data feeds from a marketplace associated with refund fraud services; and training, by the service provider server, the machine learning model using the first training data set and the at least the second training data set.

7. The method of claim 6, wherein prior to the storing, the database contains no decision records associated with the first entity.

8. The method of claim 6, wherein the one or more refund requests are associated with transactions conducted between the second entity and a plurality of different entities.

9. The method of claim 6, further comprising:

obtaining, from the database, a transaction history associated with the second entity, the transaction history including one or more previous transactions associated with the second entity;

extracting metadata relating to the transaction history; and determining, based on evaluating the extracted metadata, a risk score representing a risk of fraud associated with the second entity, wherein the first decision is generated further based on the risk score.

10. The method of claim 9, further comprising:

determining that the risk score exceeds a fraud tolerance threshold, wherein the first decision is generated further based on the determining that the risk score exceeds the fraud tolerance threshold.

11. The method of claim 9, further comprising:

receiving, via the network, a third decision made by the third entity for the first refund request; and updating the risk score for the second entity based on the third decision made by the third entity.

12. The method of claim 9, wherein the determining the risk score comprises:

detecting one or more anomalies in the transaction history based on the metadata;

identifying one or more attributes of the transaction history that correspond to the one or more anomalies;

providing the one or more attributes as one or more inputs to the machine learning model; and generating the risk score for the second entity based on an output of the machine learning model.

13. The method of claim 6, wherein the generating the training data further comprises generating a third training data set corresponding to a second transaction conducted between the second entity and a fourth entity.

14. A non-transitory machine-readable medium having stored thereon machine-readable instructions executable to cause a machine to perform operations comprising:

receiving, via a first network from a first device, a first refund request for a transaction between a first entity and a second entity;

obtaining a transaction history associated with the first entity, wherein the transaction history comprises at least one transaction between the first entity and a third entity different from the second entity;

extracting, from the obtained transaction history, metadata relating to a plurality of transactions previously conducted by the first entity;

determining, using a machine learning model and based on evaluating the extracted metadata, a risk score for the first refund request, the risk score indicating a risk of fraud associated with the first refund request;

generating a first decision on whether to authorize the first refund request for the transaction based on the risk score;

accessing a database that is accessible by the second entity and the third entity;

storing the first decision in the database;

obtaining, from the database, a decision history of refund requests associated with the first entity;

identifying, from the decision history, a second decision that has been provided by the second entity for a second refund request associated with the transaction, wherein the second decision is different from the first decision generated for the first refund request;

generating a first training data set for training the machine learning model based on the first decision and the second decision, wherein the first training data set comprises attributes associated with the transaction and a first label representing the first decision;

modifying the first label of the first training data set based on the second decision;

generating at least a second training data set based on refund decision data obtained from different data sources, wherein the different data sources include transaction records associated with the plurality of accounts with the service provider and one or more data feeds from a marketplace associated with refund fraud services; and training the machine learning model using the first training data set and the at least the second training data set.

15. The non-transitory machine-readable medium of claim 14, wherein the determining the risk score comprises:

detecting one or more anomalies in the plurality of transactions based on analyzing the metadata;

identifying one or more attributes of the plurality of transactions that correspond to the one or more anomalies;

providing the one or more attributes as one or more inputs to the machine learning model; and determining, based on an output of the machine learning model, the risk score for the first refund request.

16. The non-transitory machine-readable medium of claim 15, wherein the one or more attributes include one or more of: a shipping address, a return address, a device location, or a refund request frequency associated with the first entity, and wherein the one or more anomalies include one or more of: a mismatch between the shipping address and the return address, a mismatch between the shipping address and the device location, or the refund request frequency exceeding a predetermined frequency threshold.

17. The non-transitory machine-readable medium of claim 14, wherein the database contains no decision records associated with the first entity prior to the storing the first decision.

18. The non-transitory machine-readable medium of claim 14, wherein the plurality of transactions was conducted between the first entity and a plurality of different entities.

19. The system of claim 5, wherein the one or more refund requests are associated with transactions conducted between the first entity and a plurality of different entities.

20. The system of claim 1, wherein the database contains no decision records associated with the first entity prior to the storing the first decision.

* * * * *